Patented Aug. 22, 1944

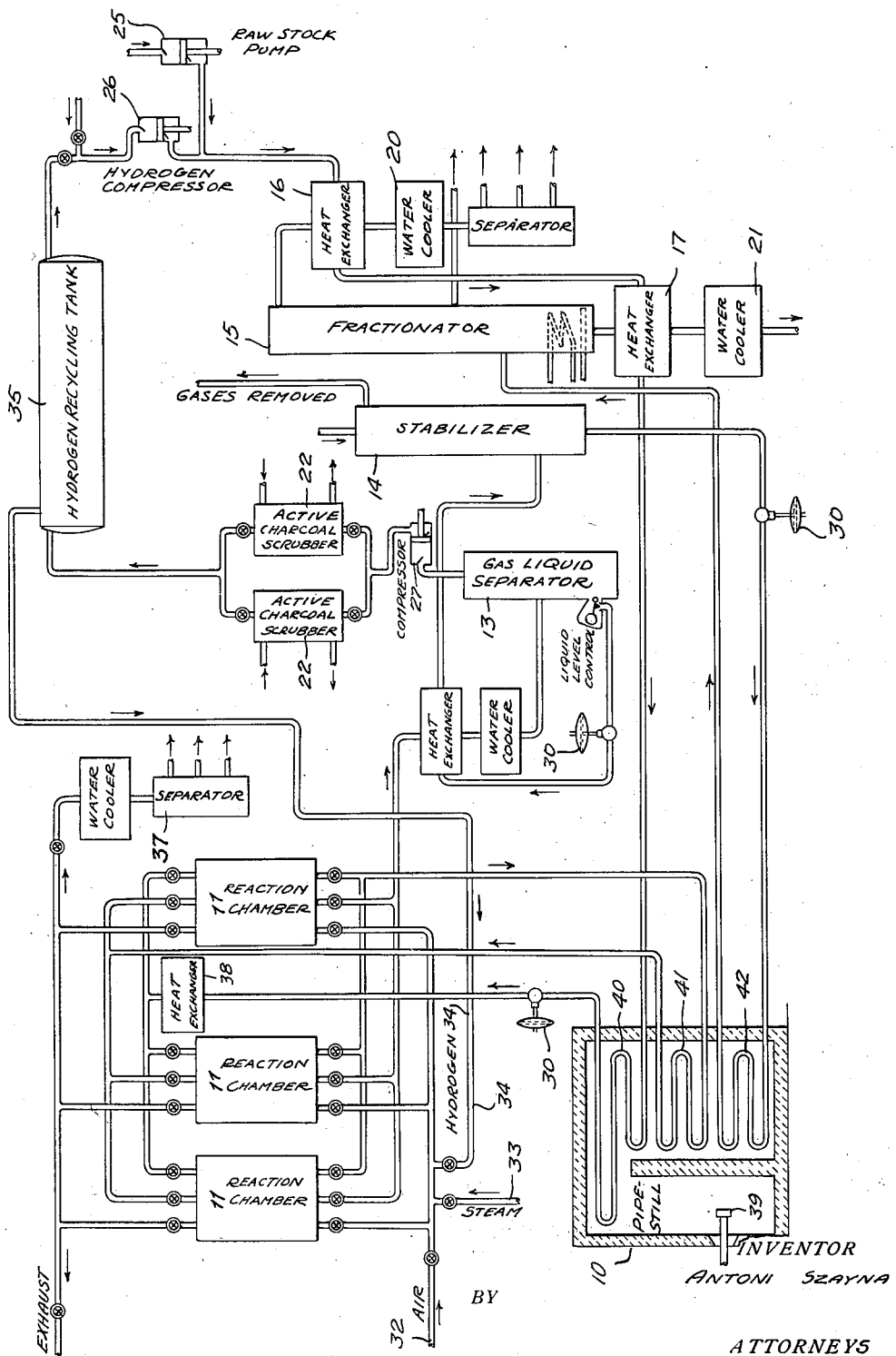

2,356,711

UNITED STATES PATENT OFFICE 2,356,711

TREATMENT OF HYDROCARBONS

Antoni Szayna, New York, N. Y., assignor to Albert Chester Travis, New York, N. Y.

Application January 9, 1942, Serial No. 426,115

9 Claims. (Cl. 196—62)

This invention relates to treatment of petroleum and like products.

This is a continuation-in-part of my copending applications Serial No. 117,673 of December 24, 1936; Serial No. 231,298 of September 23, 1938; and Serial No. 233,983 of October 8, 1938, now U. S. Patents Nos. 2,273,297, 2,273,298, and 2,273,299, respectively, which applications disclose and relate to the treatment of oils in the presence of hydrogen by passing them at high temperatures over an inhibited metallic contactor comprising the metals of the group: nickel, cobalt and iron, with or without simultaneous cracking, reforming or other modification of the oil, and the contactor as such and its regeneration after use. The contactor, as therein disclosed, is partially poisoned or inhibited to control and limit its catalytic action. When the contactor becomes exhausted it is submitted to a controlled regeneration, preferably by air and steam in proportions controlled to leave a small amount of the sulfur therein to serve as an inhibiting agent.

I have found that, under special conditions of treatment described below, the inventions of my said prior applications are capable of producing surprising results and improved products which have been much sought after.

One object of my present invention is to provide a process producing higher yields of cracked gasoline of high octane number, of a non-corrosive nature and generally of excellent quality.

Another object is to achieve reforming and treating in a single operation.

Another object is to produce highest quality motor fuels from stocks which have been regarded as inferior, as well as from high quality raw-stock, and with good efficiency and economy.

Still another object is to reduce the production of hydrocarbon gases and other undesired by-products per unit of gasoline formed.

Another object of the invention is the production of aromatic hydrocarbons.

In my present invention I have improved the mode of operation from that disclosed in my said prior applications by using materially higher pressures in the pipe-still to achieve there more favorable conditions for cracking of the raw-stock in the presence of hydrogen and then releasing the fluids under lower pressure into reaction chambers containing the contactor where, among other reactions, dehydrogenation of the oil becomes prominent. The vapors and gases from the reaction chambers are separated and the liquid product is fractionated. The operation results in high yields of high-octane gasoline of low-sulfur and a non-corrosive nature.

All distillates boiling up to 720° F., e. g., deriving from petroleum, coal, lignite or shale, can be treated in my new process, but especially suitable are distillates of virgin, or cracked, or mixed nature, deriving from petroleum, which are rich in hydrogen and have a rather narrow boiling range such as, e. g., heavy naphtha or kerosene. All of these are included in the general designation "oil" as used herein.

The many reactions involved in my invention take place in a pipe-still and/or in one or more reaction-chambers. It is preferable to keep a substantially higher pressure in the pipe-still than in the chambers. The operation should be conducted so as to effect at least a substantial part of cracking and advantageously a substantial consumption of hydrogen under high pressure of 500 to 2,000 lbs./sq. inch in the pipe-still, and to maintain in the reaction chambers lower pressure of 50 to 500 lbs. and other conditions favorable to dehydrogenation and desulfurization.

The oil and hydrogen mixture in the pipe-still under high pressure is gradually heated to a temperature of 850° to 1050° F. and maintained at that temperature for a period of time necessary for cracking heavy hydrocarbons into gasoline. At least some of the resulting hydrocarbons are simultaneously hydrogenated under high pressure prevailing. The presence of hydrogen and maintenance of high pressure under cracking conditions results in a substantially higher yield of gasoline, than in ordinary cracking, while simultaneously less gaseous hydrocarbons are formed per unit of gasoline produced. It seems that this hydrogenation without the presence of other catalysts than the metallic walls of the cracking coil of the pipe-still, is limited practically only to hydrocarbon radicals engendered by cracking, and the proportion of radicals thus hydrogenated is proportional to the concentration of hydrogen. The presence of hydrogen is important not so much from the standpoint of the hydrogenating effect but rather because it prevents the progress of the reactions of polymerization and results in higher yields of gasoline. The degree to which hydrogenation is achieved and polymerization is prevented depends to a very large degree upon the amount of hydrogen used. I have found that between 400 and 1,500 cubic feet of hydrogen per barrel of oil (the volume taken at atmospheric pressure) substantially prevents polymerization and yields appreciably more gasoline than when operating without added hydrogen. These amounts of hydrogen depend mainly upon the character of the rawstock and the degree of cracking applied, and the limits should be widened for special cases, bearing in mind that the equilibria for reactions of hydrogenation and of polymerization depend also upon other factors, such as, e. g., temperature and pressure. Thus, when an unsaturated recycled oil deriving from a cracking unit is treated at a temperature of 970° to 1,000° F. and pressure of 1,500 lbs./sq. inch in the coil it will be more adequate to use about 1,800 cubic feet of hydrogen per barrel or even more in order to depress the polymerization phenomena so as to avoid cumbersome formation of coke and carbonaceous deposits and to assure high yields of gasoline. On the other hand, a straight-run naphtha of 250°–420° F. boiling range, deriving from Pennsylvania crude can be effectively treated at 900° to 930° F. and 600 lbs./sq. inch in the coil in the presence of only about 250 cubic feet of hydrogen per barrel of oil. Such straight-run naphthas may also be heated and cracked in a separate coil, while hydrogen-gas is heated in another coil, and then both combined and released into the same reaction chamber.

The mixture of vapors and gases passes from the pipe-still through a pressure-release-valve and possibly through a partial cooler or a heat-exchanger into one or more insulated reaction chambers connected in series. These chambers are connected so that each might be operated in rotation as first or second in series or can be segregated from the flow of vapors when exhausted and then can be regenerated. The chambers contain a contactor described in my copending applications No. 117,673 of December 24, 1936, and No. 233,983 of October 8, 1938.

Fluids coming from the pipe-still expand in the chambers and at a lower pressure and in the presence of the contactor react further. Reactions occurring in the chambers are mainly desulfurization and dehydrogenation, but other reactions, such as, e. g., cracking and hydrogenation, occur also but to a smaller degree. Also polymerization can be often noticed although it is undesirable and can be avoided, especially when dealing with straight-run stocks, e. g., by the presence of sufficient amounts of hydrogen.

The conditions prevailing in the reaction chambers, namely, relatively low pressure, e. g., below 500 lbs./sq. ft., high temperatures, e. g., 700°–950° F. (although lower than in the pipe-still by at least about 50° F.) and moderate concentration of hydrogen in the presence of an inhibited nickel contactor, such as that described in my above-mentioned applications, influence the hydrogenation equilibria and cause dehydrogenation of saturated hydrocarbons and simultaneous hydrogenation of the more highly reactive unsaturated hydrocarbons. As a result, in the hydrocarbon mixture coming from this process there are found large amounts of aromatic hydrocarbons and others of the more stable unsaturated hydrocarbons in addition to saturated paraffins and naphthenes and only very small amounts of diolefins and other gum-forming hydrocarbons.

Subsequent handling of the fluids is a matter of well known engineering principles and can be conducted, e. g., as outlined in the following example. Thus, when this mixture of hydrocarbon vapors and gases leaves the last chamber it passes through a heat-exchanger and water-cooler into a gas-liquid separator. The liquid, after re-heating, is released with reduction of pressure into a fractionating tower and a stabilizer. The gasoline fraction is stored or is given any desired further treatment. This fraction has a high-octane number and is non-corrosive, of very low sulfur content and usually of good stability. If it should be desired to improve the stability of the gasoline, the fluids from the reaction chamber may first pass through a layer of adsorptive clay or silica gel in order to improve the gums, color and stability, or the condensed liquid before fractionation can be washed with small amounts of diluted acid and caustic. This may be desirable in any case with products from raw-stocks containing phenols and nitrogen bases.

Gas from the separator is scrubbed with oil to reclaim any remaining gasoline vapors and remove hydrocarbon gases, if necessary under further increased pressure; or it is passed through active charcoal or other adsorbent to remove condensible vapors and gaseous hydrocarbons; and it is then recycled, stored or used for reduction in regeneration of the contactor or is released for other uses. The concentration of hydrogen in these gases varies between 60 and 90%, but when deep cracking occurs in the presence of only small amounts of hydrogen its concentration can drop materially lower.

If the process is used for production of aromatic hydrocarbons such as toluene, xylene, etc., these may be separated from the liquid product, e. g., by extracting with liquid sulfur dioxide and then fractionating into cuts.

As said before, in the pipe-still, with hydrogen and the oil heated in a common coil, the reactions of hydrogenation prevail over these of dehydrogenation, and hydrogen is consumed. On the other hand, in the reaction chambers the opposite trend prevails and hydrogen is liberated. Normal operation of the whole process, especially with straight-run oils or only slightly cracked raw-stocks, yields more free hydrogen than was charged into the system, but the conditions can be so regulated that the hydrogen reactions can be kept in balance or even that a net consumption of hydrogen will be observed. I prefer to operate my process so that in the pipe-still only a small amount of hydrogen is absorbed and in the reaction chambers a larger, but not excessive, amount of hydrogen is liberated. This is especially advantageous in the case of gasolines or relatively low-boiling, virgin heavy naphthas, which do not require much cracking to improve their boiling range and which are dehydrogenated by this process only far enough to raise materially their octane number but not far enough to cause the formation of substantial amounts of polymerized or carbonaceous deposits on the contactor or serious formation of gum-forming hydrocarbons.

Equilibrium of hydrogenation-dehydrogenation in my process is controlled to avoid, on the one hand, any extreme of deep dehydrogenation and, on the other hand, excessive hydrogenation, while conditions are used which favor dehydrogenation of saturated hydrocarbons and hydrogenation of reactive unsaturates which, if left in the product would cause polymerization, instability and formation of gums. Thus, my process serves to produce as much of the relatively stable unsaturated and aromatic hydrocarbons as is compatible with the desire to avoid harmful, excessive polymerization. If a high-octane number is primarily the aim, then the dehydrogenation can be further promoted even at the cost of greater polymerization and production of gum-forming hydrocarbons. In this case the resulting gasoline can be treated to remove products of, or otherwise to correct the effects of, any excessive dehydrogenation.

The extent of the reactions of cracking and of dehydrogenation can be controlled independently by using higher temperatures for more intense cracking and lower pressure and lower concentration of hydrogen for more intense dehydrogenation. Increase of temperature also intensifies the reactions of dehydrogenation but by control of pressure and hydrogen concentration, the desired result may be secured.

The temperatures, times, pressures and concentrations of hydrogen, first in the pipe-still and later in the contact chamber are the factors by which the extent of cracking, hydrogenation, dehydrogenation, polymerization and formation of branched chain and cyclic compounds is controlled; and within the scope of the present invention as herein set forth these factors may be varied according to the particular type of product desired and in accordance with known principles. Further latitude may be achieved by the separate heating of at least a part of the hydrogen used and adding it to the oil after the oil has passed through a part or all of the cracking coils.

In the pipe-still the reactions require less heat than an analogous operation of ordinary cracking or reforming conducted without added hydrogen, because reactions of hydrogenation are exothermic and counter-balance, to a certain extent, the heat requirements for thermal cracking of hydrocarbon molecules. On the other hand, reactions of dehydrogenation occurring in the reaction chambers are endothermic and cause a drop of temperature unless counterbalanced by heating.

As the reactions of dehydrogenation increase with the temperature, the dehydrogenation may be enhanced, if so desired, by passing the effluent from the first reaction chamber through a separate heating coil in the pipe-still before passing it into a second chamber in series. If enough dehydrogenation is achieved in the first chamber, the second chamber can be omitted, or it can be utilized as an additional catalytic space where the oil vapors are given additional time for better treatment with respect to desulfurization and, if the temperature therein is low enough, e. g., 650°–850° F., to achieve eventually an almost complete hydrogenation of the gum-forming and unstable components.

When desired, an additional amount of hydrogen can be introduced at other points in the passage of the oil. I find it particularly advantageous with some stocks to supply such additional hydrogen in the last chamber as this decreases reactions of dehydrogenation in this final stage, and simultaneously helps to saturate any gum-forming and unstable constituents of the oil which may have been produced.

In the preferred mode of operation, the inhibited nickel contactor of my prior copending applications above-mentioned is used and its use results in a non-corrosive product of very low sulfur-content. My invention could also be operated, although less advantageously, with catalysts of the "sulfur-immune" type, such as, e. g., sulfides of nickel, cobalt, iron and molybdenum or oxides of chromium, molybdenum and tungsten. These "sulfur-immune" catalysts are, however, more difficult to regenerate properly and are less efficient and in the case of sulfur-containing oils will generally yield products contaminated with hydrogen sulfide. Initially-sulfur-free metallic catalysts of high activity, namely, nickel, cobalt and iron, cannot be used in the range of temperature prevailing in my reaction chambers, because they exhibit a harmful phenomenon of catalytic decomposition of oils into carbon and gas (mainly hydrogen) unless inhibited as disclosed in my already mentioned copending applications. Copper catalyst is less effective, but could be used for low-sulfur rawstocks.

When the contactor becomes exhausted it is regenerated periodically in order to prepare it for further operation. With a nickel contactor this is advantageously done in accordance with the method shown in my said copending applications by the use of air and steam. I prefer to regenerate holding the temperature within the range about 700° to 1,100° F., but I have found that the upper limit of temperature can be increased in some cases, e. g., to about 1,500° F., without high temperature injury to the contactor, depending on the composition of the particular contactor used. A suitable composition of the contactor can be, for example, 7% nickel and 5% alumina deposited on pumice with the small amount of sulfur distributed substantially throughout for the inhibiting effect (this sulfur not being included in the calculation of percentages given). The proportion of nickel may be varied up to about 25% in relation to the inert carrier, depending upon engineering considerations, especially the size of the reaction chambers.

The regenerated contactor with the nickel or other contact metal in an oxide form is preferably reduced by the recycle-hydrogen gas to free most of said metal; but still leaving the small amount of sulfur poisoning as set forth in the copending applications. This reducing step can be omitted but its omission will cause a temporary decrease in the proportion of hydrogen while the contactor is undergoing reduction by the oil-hydrogen mixture. Unless other precautions are taken to prevent it, an excessive polymerization at the beginning of the cycle may result.

In the accompanying drawing I have shown diagrammatically one apparatus which is designed for carrying out my invention. It is to be understood, however, that neither this apparatus nor the description of the process and of various alternatives contained in this specification is intended to be exhaustive or limiting of the invention, but, on the contrary, these are given merely for purposes of illustration and explanation in order that others may so fully understand the invention and the principles thereof and how it can be embodied in practical use that they will be enabled in accordance with this invention to modify and adapt it with various apparatus and numerous variations in the process, each as may be best adapted to the conditions and requirements of any particular use.

In this drawing, which will also serve as a flow-sheet of the process, the apparatus is shown as being comprised broadly of a pipe-heater 10, two or more reaction chambers 11, an appropriate product separation and treating apparatus including an oil-gas separator 13, a stabilizer 14, a fractionator 15, heat-exchangers 16, 17, water coolers 20, 21, scrubbers and/or adsorbers 22 for recycle-hydrogen-gas, pumps 25, compressors 26, 27, automatic pressure-release-valves 30 and appropriate accessory equipment for regeneration of the exhausted contactor represented by the supply lines 32, 33, 34, for air, steam and hydrogen respectively, the tank 35 for storing hydrogen, and the cooler or heat-exchange economizer and separator 37 for exhaust gases from the regeneration step.

This apparatus, for example, may be the same as the apparatus used for the process of my above-mentioned pending patent application Serial No. 233,983 with addition of a heat-exchanger 38 for partial cooling of the vapors from the pipe-still, an automatic pressure-release and control-valve 30 between the pipe-still 10 and the chambers 11, and a burner 39 in the pipe-still capable of giving the higher temperatures specified above.

The pipe-heater 10 comprises three separate heating coils: coil 40 serves for heating and cracking or reforming of the raw-stock or a mixture of raw-stock and recycle-oil, a second coil 41 may be provided for reheating of fluids between the first and the last reaction-chamber, and the third coil 42 for re-heating of liquid oil between the stabilizer 14 and the fractionator 15. One might provide also, more or fewer coils in this same furnace of in separate furnaces, for separate heating of part or all of the fresh feedstock, recycle oil (if recycling is used), hydrogen, and/or partially treated vapors, if intermediate heating is used.

The product recovery apparatus and the apparatus for regeneration may be in accord with those set forth in detail in my said copending applications, and can, of course, be varied in accord with principles known in the art.

The contact chambers 11 may be rotated in the series periodically and cut out for regeneration, by manipulation of the valves shown, substantially as in the apparatus shown and described in my copending applications.

As an example of the operation of this apparatus, straight run naphtha of 250° to 420° F. boiling range was fed by pump 25 through a heat-exchanger into the cracking coil 40 together with about 1500 cubic feet of recycled hydrogen per barrel of naphtha. The mixture of the naphtha and hydrogen was heated in the pipe-still with a temperature range from about 850° to 1050° F., and at a pressure in the range of about 500 to 2000 pounds per square inch. The resulting mixture of gas and oil, with or without cooling in the heat-exchanger 38, was released through the valve 30 into the first of two reaction chambers 11 connected in series. The operating pressure in these chambers was kept below 500 pounds per square inch. The chambers contained my inhibited nickel catalyst described and claimed in my said copending applications. The temperatures in the two chambers during the run were kept within the range 700°–950° F., and were at least 50° F. lower than in the coil.

The resulting mixture of gas and vapors leaving the chambers was cooled and the gases and liquids were then separated in the separator 13. The liquids from the separator 13 were reheated in the heat-exchanger and stabilized in the stabilizer 14. The stabilized liquid was released through the expansion valve 30, reheated in the coil 42 and then fractionated in the fractionator 15. The gases from the separator 13 passed through an active charcoal absorber 22 into the hydrogen recycling tank 35.

The stabilized liquid had a very much increased octane number and very low sulfur content. It was sweet and non-corrosive. Its A. P. I. gravity was lower than that of the charge. The aromatic content, determined by the sulfuric acid absorption, was very high.

What is claimed is:

1. A process for treating hydrocarbon distillates with production of gasoline, which comprises subjecting an oil to thermal cracking at high pressure in the presence of a substantial excess of hydrogen beyond that which reacts with the oil, whereby to suppress objectionable formation of polymers during the cracking, expanding the resulting vapors and hydrogen to a lower pressure and subjecting them at lower temperature to a catalytic treatment on a hydrogenation-dehydrogenation catalyst which does not catalyze the decomposition of oil into carbon and hydrogen at said temperature, and regulating the conditions of such treatment to favor dehydrogenation of saturated hydrocarbons and at the same time to favor hydrogenation of unstable gum-forming hydrocarbons.

2. A process for treating hydrocarbon distillates with production of gasoline, which comprises cracking an oil at high pressure in the absence of active extended-surface catalysts but in the presence of a substantial excess of hydrogen beyond that which reacts with the oil, whereby to suppress objectionable formation of polymers by the cracking, expanding the resulting vapor and hydrogen to a lower pressure and subjecting them to a catalytic treatment on a hydrogenation-dehydrogenation catalyst which does not catalyze the decomposition of oil into carbon and hydrogen at a temperature range below that of said cracking step but sufficiently high to favor dehydrogenation of saturated hydrocarbons but at the same time sufficiently low to favor hydrogenation of unstable gum-forming hydrocarbons, reheating the oil and gas mixture resulting from this catalytic treatment and again passing it over such hydrogenation-dehydrogenation catalyst within said reduced temperature range.

3. A process for treating hydrocarbon distillates with production of gasoline, which comprises cracking an oil in the temperature range 850°–1050° F. under pressure within the range 500–2,000 pounds per square inch and with an amount of hydrogen in excess of about 250 cubic feet per barrel of oil but without aid of extended surface hydrogenation catalyst, expanding the resulting mixture of gas and vapor to a pressure below 500 pounds per square inch and not more than about one-third that of the cracking step and passing the thus expanded mixture at temperature above 700° F. and at least about 50° lower than in the cracking step over an extended surface hydrogenation-dehydrogenation catalyst which does not catalyze the decomposition of the oil into carbon and hydrogen at the highest temperatures of said oil.

4. A process for treating hydrocarbon distillates with production of gasoline, which comprises cracking an oil containing a substantial proportion of unsaturates in the temperature range 850°–1050° F. under pressure within the range 500–2,000 pounds per square inch and with an amount of hydrogen in excess of about 1500 cubic feet per barrel of oil but without aid of extended surface hydrogenation catalyst, expanding the resulting mixture of gas and vapor to a pressure below 500 pounds per square inch and not more than about one-third that of the cracking step and passing the thus expanded mixture at temperatures above 700° F. and at least about 50° lower than in the cracking step over an extended surface hydrogenation-dehydrogenation catalyst which does not catalyze the decomposition of the oil into carbon and hydrogen at the highest temperature of said oil.

5. A process for treating hydrocarbon distillates with production of gasoline, which comprises cracking an oil in the presence of a substantial excess of hydrogen beyond that which reacts with the oil, whereby to suppress objectionable formation of polymers by the cracking, expanding the resulting vapors and hydrogen to a lower pressure and subjecting them at lower temperature to a catalytic treatment on a hydrogenation - dehydrogenation catalyst which does not catalyze the decomposition of oil into carbon and hydrogen, regulating the conditions of such treatment so that dehydrogenation of saturated hydrocarbons so far predominates over concomitant catalytic hydrogenation of unstable gum-forming hydrocarbons as to free a substantial excess of hydrogen, separating hydrogen from the gasoline product and recycling a part of the hydrogen by adding it to additional quantities of hydrocarbon distillates supplied to the cracking step and accumulating a part of said hydrogen and using it for reduction of catalytic metal in the regeneration of said catalyst.

6. A process for treating hydrocarbon distillates with production of gasoline, which comprises cracking an oil in the temperature range 850°–1050° F. under pressure within the range 500–2,000 pounds per square inch and with an amount of hydrogen in excess of about 250 cubic feet per barrel of oil but without aid of extended surface hydrogenation catalyst, expanding the resulting mixture of gas and vapor to a pressure below 500 pounds per square inch and not more than about one-third that of the cracking step and passing the thus expanded mixture at temperatures above 700° F. and at least about 50° lower than in the cracking step over an extended surface hydrogenation-dehydrogenation catalyst of the type having an active surface of a metal selected from the group consisting of Ni, Co and Fe partially poisoned throughout its contact area by sulfur in amount substantially less than required to convert said metal entirely to sulfide.

7. A process for treating hydrocarbon distillates with production of gasoline, which comprises cracking an oil in the presence of a substantial excess of hydrogen beyond that which reacts with the oil, whereby to suppress objectionable formation of polymers by the cracking, expanding the resulting vapors and hydrogen to a lower pressure and subjecting them at lower temperature to a catalytic treatment on a hydrogenation-dehydrogenation catalyst which does not catalyze the decomposition of oil into carbon and hydrogen and regulating the conditions of such treatment so that dehydrogenation of saturated hydrocarbons predominates while at the same time hydrogenation of unstable gum-forming hydrocarbons if present can occur and subsequently at the end of said last-mentioned treatment varying the conditions thereof to make them for a short time more favorable to hydrogenation.

8. A process for treating hydrocarbon distillates with production of gasoline, which comprises cracking an oil in the presence of a substantial excess of hydrogen beyond that which reacts with the oil, whereby to suppress objectionable formation of polymers by the cracking, expanding the resulting vapor and hydrogen to a lower pressure and subjecting them at lower temperature to a catalytic treatment on a hydrogenation-dehydrogenation catalyst which does not catalyze the decomposition of oil into carbon and hydrogen and regulating the conditions of such treatment so that dehydrogenation of saturated hydrocarbons predominates while at the same time hydrogenation of unstable gum-forming hydrocarbons if present can occur, and subsequently, at the end of said last-mentioned treatment, adding hydrogen to the reactants whereby to favor hydrogenation.

9. A process for treating hydrocarbon distillates with production of gasoline, which comprises cracking an oil in the presence of a substantial excess of hydrogen beyond that which reacts with the oil, whereby to suppress objectionable formation of polymers by the cracking, expanding the resulting vapor and hydrogen to a lower pressure and subjecting them at lower temperature to a catalytic treatment on a hydrogenation-dehydrogenation catalyst which does not catalyze the decomposition of oil into carbon and hydrogen and regulating the conditions of such treatment so that dehydrogenation of saturated hydrocarbons predominates while at the same time hydrogenation of unstable gum-forming hydrocarbons if present can occur, and subsequently, at the end of said last-mentioned treatment, decreasing the temperature of the reactants whereby to favor hydrogenation.

ANTONI SZAYNA.